(12) United States Patent
Kitamura et al.

(10) Patent No.: US 7,397,223 B2
(45) Date of Patent: Jul. 8, 2008

(54) INVERTER-INTEGRATED ELECTRICAL ROTATING MACHINE

(75) Inventors: Yutaka Kitamura, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 194 days.

(21) Appl. No.: 11/474,407

(22) Filed: Jun. 26, 2006

(65) Prior Publication Data

US 2007/0023421 A1 Feb. 1, 2007

(30) Foreign Application Priority Data

Jul. 26, 2005 (JP) ............................. 2005-215736

(51) Int. Cl.
*F02D 41/08* (2006.01)
(52) U.S. Cl. ...................................... 322/28; 290/40 A
(58) Field of Classification Search .................. 322/22, 322/19, 29, 99; 290/40 A, 40 C, 13; 363/141, 363/132, 98
See application file for complete search history.

(56) References Cited

U.S. PATENT DOCUMENTS 5,089,766 A * 2/1992 Iwatani .......................... 322/25
5,608,616 A * 3/1997 Umeda et al. ................ 363/132
5,739,676 A * 4/1998 Judge et al. .................... 322/22
5,748,463 A * 5/1998 Tsutsui et al. ................ 363/127
5,998,881 A * 12/1999 Wind et al. ................ 290/40 A

FOREIGN PATENT DOCUMENTS

JP 2004-274992 A 9/2004

* cited by examiner

*Primary Examiner*—Rajnikant B Patel
(74) *Attorney, Agent, or Firm*—Sughrue Mion, PLLC

(57) ABSTRACT

An inverter-integrated electrical rotating machine is provided in which each switching device of an inverter and power wiring and control wiring for connecting them can be highly protected electrically and mechanically while the cooling property of the switching devices can be improved. Cooling air flows led in from cooling air flow suction holes in an end wall of an inverter case simultaneously flow in parallel from the cooling air flow suction holes on inner and outer sides in the radial direction. The cooling air flows then penetrate an inverter device in an axial direction through an outer circumferential cooling air passage formed by an outer circumferential lateral plate part and an inner circumference of the inverter case and an inner circumferential cooling air passage formed between an inner circumferential lateral plate part and a cover surrounding a rotary shaft. The cooling air flows are then led into a motor housing from a cooling air flow suction hole of the housing.

21 Claims, 9 Drawing Sheets

INVERTER-INTEGRATED ELECTRICAL ROTATING MACHINE

BACKGROUND OF THE INVENTION

1. Field of the Invention

This invention related to an inverter-integrated electrical rotating machine.

2. Description of the Related Art

Conventionally, a inverter-integrated vehicle electrical rotating machine has been proposed in which reduction in size and weight and reduction in wiring loss are realized by integrating an inverter with a polyphase AC electrical rotating machine, the inverter being provided between a DC power source and an armature wiring of the polyphase AC electrical rotating machine to enable supply and reception of power, and the inverter applying a polyphase AC voltage to the armature wiring.

This inverter needs to be protected electrically and mechanically since it is a circuit device in which many power transistors (switching devices) and an inverter control circuit for performing driving control of the power transistors are wired in a complicated manner. Therefore, in the conventional inverter-integrated vehicle electrical rotating machine, the inverter is sealed in a closed box or case made of metal or resin and fixed on a circumferential wall or end wall of the housing of the electrical rotating machine. Hereinafter, the mode of fixing the inverter on the circumferential wall is called circumferential wall fixing mode, and the mode of fixing the inverter on the end wall is called end wall fixing mode.

However, the switching devices of the inverter generate large power loss at the time of switching and making electrical continuation in electrically driving the electrical rotating machine. Therefore, it is a particularly important task to cool each switching device constituting the inverter. Conventionally, an air cooling mode of cooling the inverter by cooling air and a water cooling mode of cooling the inverter by cooing water have been known.

For example, in the air-cooling end wall fixing mode disclosed in JP-A-7-231672, an inverter having a rotary shaft formed in a U-shape or horseshoe-shape on a radial cross section is used. This inverter of the air-cooling end wall fixing mode is advantageous for realizing reduction in constitution and reduction in size and weight since reduction in motor diameter and simplification of the cooling mechanism can be expected. This inverter is particularly preferred when it is provided in a field-coil-type synchronous motor because the inverter can be arranged at a position that overlaps the position of the brush in the axial direction and that is different from the position of the brush in the circumferential direction.

However, in the above-described inverter-integrated vehicle electrical rotating machine of the air-cooling end wall fixing mode, it is not easy to highly protect each switching device of the inverter electrically and mechanically, maintain sufficient cooling of each switching device, and realize miniaturization of the inverter at the same time.

On the other hand, as disclosed in JP-A-2004-274992, a technique of inverter-integrated vehicle electrical rotating machine has been proposed in which good electrical and mechanical protection of the switching devices of the inverter, high switching device cooling performance and miniaturization of the inverter are realized at the same time.

However, in the inverter-integrated vehicle electrical rotating machine of the air-cooling end wall fixing mode disclosed in JP-A-2004-274992, it is difficult to realize further improvement in cooling while highly protecting each switching device of the inverter electrically and mechanically.

More specifically, in order to provide good electrical and mechanical protection of the switching devices of the inverter and the power wiring and control wiring for connecting the switching devices, these elements must be sufficiently sealed and fixed in the case with insulating resin or the like. However, if the sealing property is thus improved by using insulating resin or the like and the case is miniaturized, the surface area of a cooling heat sink part is significantly reduced and the construction of a cooling air passage becomes inappropriate. This causes a problem that the cooling property of the switching devices or the like is deteriorated.

SUMMARY OF THE INVENTION

In view of the foregoing status of the art, it is an object of this invention to provide an inverter-integrated electrical rotating machine in which switching devices of an inverter and power wiring and control wiring for connecting the switching devices can be highly protected electrically and mechanically while the cooling property of the switching devices can be improved.

An inverter-integrated electrical rotating machine according to an aspect of this invention includes a electrical rotating machine that has a cooling fan fixed on a rotary shaft and sucks a cooling air flow from one end wall of a housing, and an inverter device that is situated on an outer side in an axial direction from the one end wall of the housing and fixed on the housing. The inverter device has at least plural switching devices forming an inverter circuit that converts input DC power to AC power and feeds a stator coil of the electrical rotating machine, a control circuit that controls the inverter circuit, a heat sink case that surrounds and houses the switching devices and the control circuit and also houses wirings for connecting the switching devices and the control circuit, and an inverter case that integrally fixes and houses the heat sink case. The heat sink case has a wheel-like bottom plate part extended substantially in a radial direction, a small-diameter cylindrical inner circumferential lateral plate part integrally extended from the bottom plate part toward one end wall of the housing while securing a predetermined space with respect to a cover surrounding the rotary shaft, a large-diameter cylindrical outer circumferential lateral plate part integrally extended from the bottom plate part toward the one end wall of the housing, and a ring-shaped aperture opened toward the one end wall of the housing. The bottom plate part, the inner circumferential lateral plate part and the outer circumferential lateral plate part are made of a highly thermally conductive metal material as a cooling heat sink, and form an outer circumferential cooling air passage between the outer circumferential lateral plate part and the inverter case and an inner circumferential cooling air passage between the cover and the inner circumferential lateral plate part. A cooling air flow that is led in from a cooling air flow suction hole formed in the end wall of the inverter case flows in an axial direction along the outer circumferential cooling air passage and the inner circumferential cooling air passage and then flows into the housing.

According to the inverter-integrated electrical rotating machine of this invention, the bottom plate part, the inner circumferential lateral plate part and the outer circumferential lateral plate part of the inverter device form an integral shape, and all these parts are made of a highly thermally conductive metal material as a cooling heat sink. Therefore, a large surface area for cooling can be secured. Also, since the cooling air passages are formed in the axial direction along the inner circumferential lateral plate part and the outer circumferential lateral plate part, the ventilation resistance is small and a high flow rate of cooling air can be secured. The switching devices or the like of the inverter device and the power wiring and control wiring for connecting the switching devices can be highly protected electrically and mechanically, while the switching devices or the like having a large calorific value can be efficiently cooled.

DETAILED DESCRIPTION OF THE PREFERRED EMBODIMENTS

Embodiment 1

Figure 1:
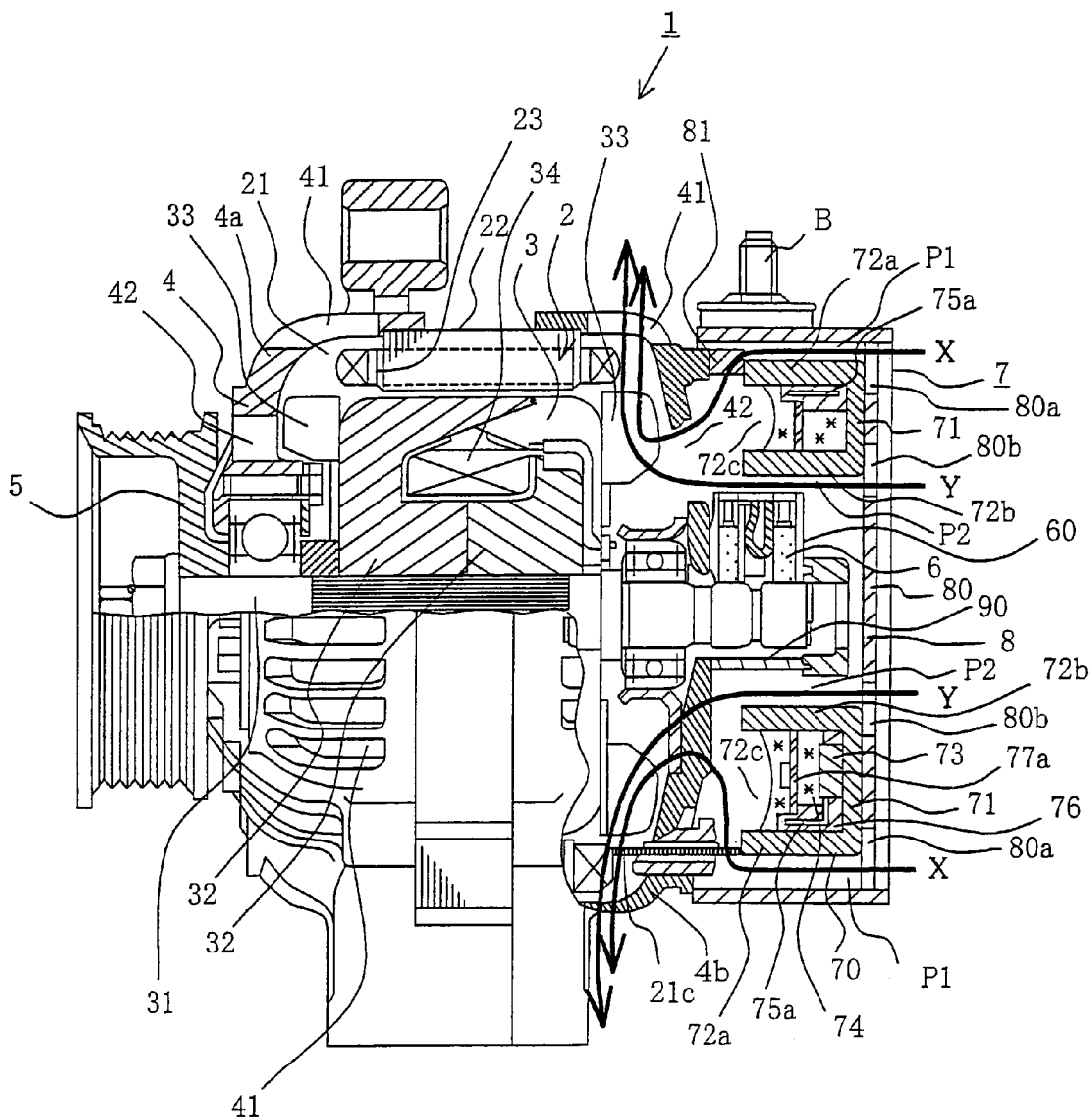
FIG. 1 is a longitudinal sectional view showing the structure of an inverter-integrated electrical rotating machine according to Embodiment 1 of this invention.
Figure 2:
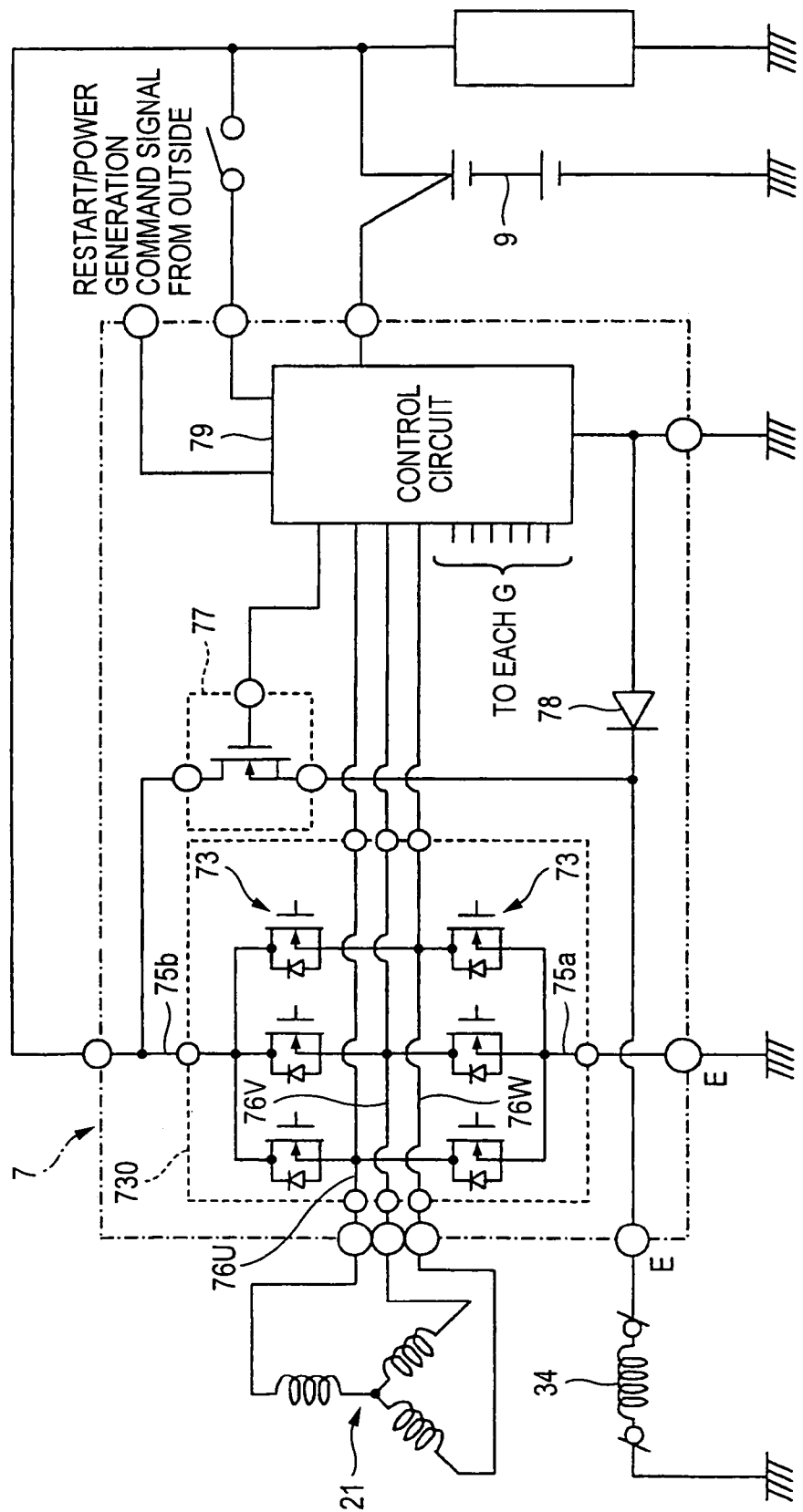
FIG. 2 shows a concept of a system circuit including the inverter-integrated electrical rotating machine of FIG. 1.

FIG. 1 is a longitudinal sectional view showing the structure of an inverter-integrated electrical rotating machine according to Embodiment 1 of this invention. FIG. 2 shows a concept of a system circuit including the inverter-integrated electrical rotating machine of FIG. 1.

In FIG. 1, a vehicle electrical rotating machine 1 has a stator 2, a rotor 3, a housing 4, a pulley 5, a brush 6, and an inverter device 7.

On the inner circumferential surface of the circumferential wall of the housing 4, the stator 2 including a stator core 22 having a stator coil 21 wound thereon is fixed. 23 represents an insulating sheet covering the stator coil 21. The rotor 3 is housed on the inner side from the stator 2 in the radial direction. The rotor 3 includes a rotary shaft 31 that is rotatably supported between both end walls 4a, 4b of the housing 4 and that has the pulley 5 fixed on its one end side, a Randell-type rotor core 32 fitted and fixed to the rotary shaft 31, cooling fans 33 fixed on the end surfaces of the rotor core 32, and a field coil 34 wound on the rotor core 32.

Cooling air flow blowout holes 41 are formed on both sides of the circumferential wall of the housing 4. Cooling air flow suction holes 42 are formed in both end walls 4a, 4b of the housing 4. A cooling air flow (wind) sucked from the cooling air flow suction holes 42 is physically energized by the two cooling fans 33, thus cools the coil end of the stator coil 21, and is blown outward from the cooling air flow blowout holes 41.

A pair of slip rings is provided on the other end side of the rotary shaft 31 protruding from the rear end wall 4b of the housing 4. In contact with these slip rings, a pair of brushes 6 is housed in a brush holder 60 made of resin.

The structure and operation of the Randell-type electrical rotating machine are already known and therefore will not be described further in detail.

Next, the inverter device 7, which characterizes this embodiment, will be described.

The inverter device 7 has a doughnut-shaped heat sink case 70 with its one end side opened. 71 represents a wheel-like bottom plate part of the heat sink case. 72a represents a ring-shaped outer circumferential lateral plate part protruding from the outer circumferential edge of the bottom plate part 71 toward the housing 4. 72b represents a ring-shaped inner circumferential lateral plate part protruding from the inner circumferential edge of the bottom plate part 71 toward the housing 4. The heat sink case 70 is made of a highly thermally conductive metal material as a cooling heat sink in which these bottom plate part 71, outer circumferential lateral plate part 72a and inner circumferential lateral plate part 72b are continuously and integrally coupled with each other. The heat sink case 70 has an aperture 72c opened toward the rear end wall 4b of the housing 4.

A switching device 73 forming an inverter circuit is fixed on the bottom plate part 71 of the heat sink case 70 together with a field current control transistor, not shown in FIG. 1.

These circuit elements of the inverter device 7 are fixed on the bottom plate part 71 of the heat sink case 70 and electrically connected. After that, the heat sink case 70 is filled with a resin 74 in order to embed the circuit elements and connecting parts.

The heat sink case 70 is housed and integrally fixed in a bottomed cylindrical inverter case 8 made of a resin material. On an end wall 80 of the inverter case 8, the bottom plate part 71 of the heat sink case 70 is integrally fixed, and cooling air suction holes 80a, 80b are formed at positions corresponding to the outer circumferential lateral plate part 72a and the inner circumferential lateral plate part 72b of the heat sink case 70. This inverter case 8 insulates from outside and mechanically protects the heat sink case 70, which also functions as a +bus bar described below. The inverter case 8 also insulates, on its outer circumference, a +B terminal (indicated by symbol B in FIGS. 1 and 2) wire-connected to the +terminal of a battery 9, and houses a connector or the like (not shown) for inputting external signals.

Moreover, in FIG. 1, 21c represents a lead-out line of a wiring of each phase of the stator coil 21, and it is joined to an AC bus bar of each phase of the inverter device 7, not shown.

The circuit construction of the inverter device 7 is shown in FIG. 2.

The inverter device 7 includes an inverter circuit 730 formed by connecting six switching devices 73 of MOS transistors by bus bars, a field current control transistor 77, a fly-wheel diode 78, and a control circuit 79. A field current supplied to the field coil 34 is controlled by the field current control transistor 77. Each switching device 73 and the field current control transistor 77 are controlled by the control circuit 79 formed by an IC. Actually, each part of the inverter circuit 730 and the control circuit 79 have many small-current wirings for detecting the potential and current at each part of the inverter circuit 730 and for controlling the gate potential of the switching devices 73. In this embodiment, these small-current wirings are formed on a terminal board 76 fixed inside the heat sink case 70. These small-current wirings are thin and therefore may be covered with the resin 74, instead of being integrally molded with the terminal board 76.

76U, 76V and 76W represent AC bus bars (AC plate parts) forming the AC wirings of the inverter circuit 730. These are embedded as large-current wirings of the inverter circuit 730 by integrated resin molding in the terminal board 76, together with a −bus bar (DC plate part) 75a.

In the inverter device 7, since a base plate to the drain side of the switching device 73 on the upper arm is directly and electrically joined by soldering or the like to the bottom plate part 71 of the heat sink case 70, the heat sink case 70 also functions as a +bus bar 75b. Therefore, the heat sink case 70 is fixed to the rear wall of the housing 4 via an insulating member 81. On the other hand, a base plate to the drain side of the switching device 73 of the lower arm is electrically joined with a heat sink (not shown), and the heat sink is fixed to the bottom plate part 71 via an electrically insulating film. The inverter device 7 has this heat sink connected to the −bus bar 75a and is thus grounded to the housing 4 through this −bus bar 75a.

Thus, when the rotor 2 is rotationally driven, cooling air flows are led into the inverter case 8 by the cooling fans 33, 33 as shown in FIG. 1. These cooling air flows enter in parallel simultaneously from the cooling air flow suction holes 80a, 80b on the outer side in the radial direction and the inner side in the radial direction, and penetrate the inverter device 7 in the axial direction as indicated by arrows X and Y in FIG. 1 through an outer circumferential cooling air passage P1 formed by the outer circumferential lateral plate part 72a and the inner circumference of the inverter case 8 and an inner circumferential cooling air passage P2 formed between the inner circumferential lateral plate part 72b and a cover 90 surrounding the rotary shaft 31. Then, the cooling air flows are led into the motor housing 4 from the cooling air flow suction holes 42 of the housing 4, then deflected to the outer side in the radial direction by the cooling fans 33, and emitted outward from the cooling air flow blowout holes 41 on the outer circumference of the housing 4.

In this manner, the cold cooling air flows led in from the cooling air flow suction holes 80a, 80b in the end wall 80 of the inverter case 8 flow along the surface of the outer circumferential lateral plate part 72a and the surface of the inner circumferential lateral plate part 72b of the heat sink case 70. Thus, a large cooling surface area (in this case, the sum of the surface area of the outer circumferential lateral plate part 72a and the surface area of the inner circumferential lateral plate part 72b) can be secured on the heat sink case 70 for cooling the internal switching devices 73 and the like.

Also, since the cooling air flow passages at the two positions, that is, the outer circumferential cooling air passage and the inner circumferential cooling air passage, are formed in parallel, the ventilation resistance does not increase and the cooling air flow rate is not lowered. Therefore, the internal switching devices and the like can be efficiently cooled via the outer circumferential lateral plate part 72a and the inner circumferential lateral plate part 72b of the heat sink case 70.

As described above, the switching devices 73 and the like of the inverter device 7 and the power wiring and control wiring for connecting the switching devices can be highly protected electrically and mechanically, while the switching devices and the like having a large calorific value can be efficiently cooled.

Moreover, the heat sink case 70 can be housed and integrally fixed in advance in the inverter case 8 made of a resin material, and the +B terminal (indicated by symbol B in FIGS. 1 and 2) wire-connected to the +terminal of the battery 9 can be insulated on the outer circumference. The connector or the like (not shown) for inputting external signals can also be housed in the inverter case 8. Therefore, the easiness in assembly improves.

Embodiment 2

Figure 3:
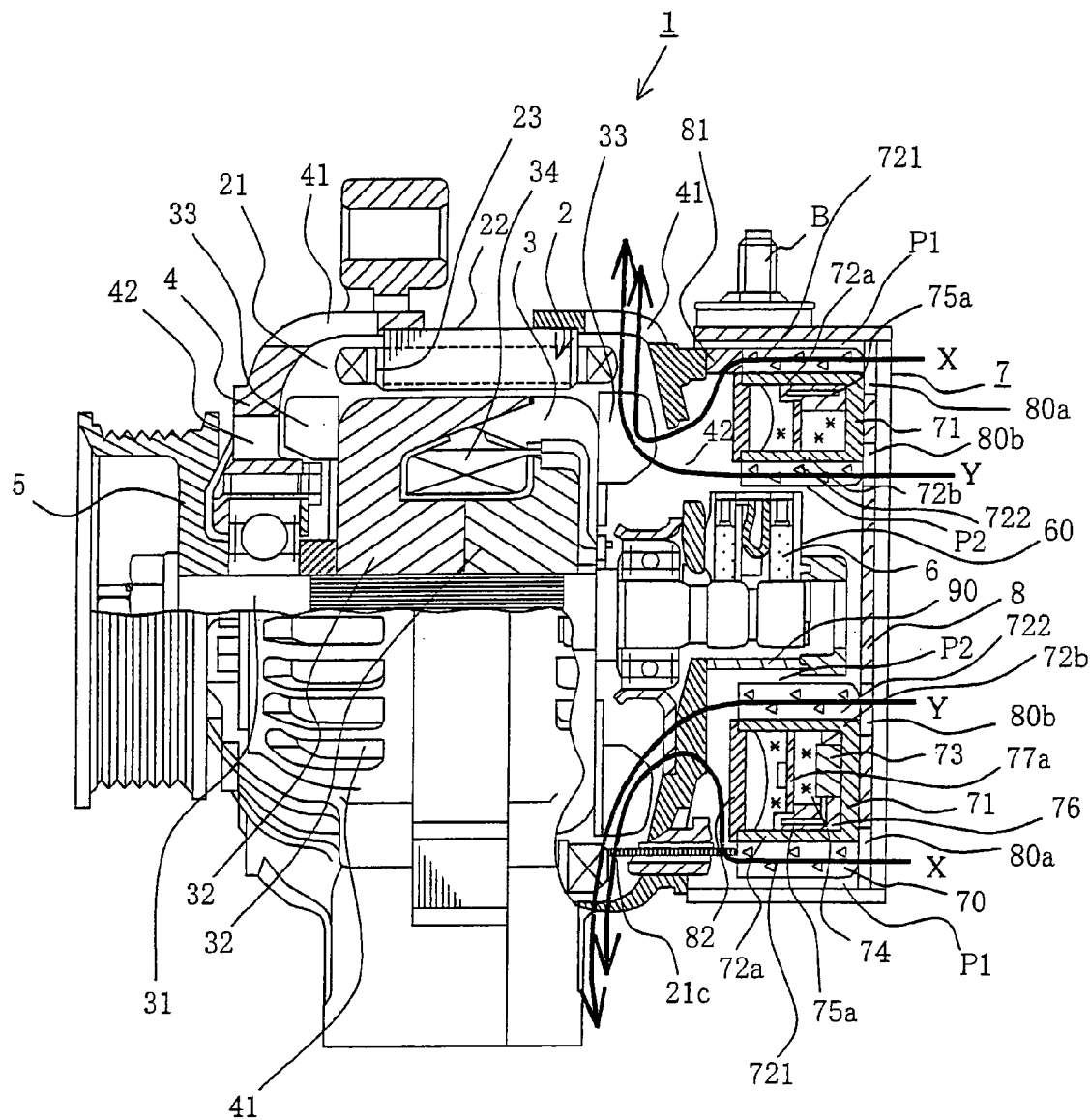
FIG. 3 is a longitudinal sectional view showing the structure of an inverter-integrated electrical rotating machine according to Embodiment 2 of this invention.

FIG. 3 is a longitudinal sectional view showing the structure of an inverter-integrated electrical rotating machine according to Embodiment 2 of this invention. This embodiment only differs from Embodiment 1 of FIG. 1 in that cooling fins 721, 722 are additionally provided respectively on the outer surfaces of the outer circumferential lateral plate part 72a and the inner circumferential lateral plate part 72b of the heat sink case 70 of the inverter device 7. The other parts of the structure are the same as in Embodiment 1 of FIG. 1.

In FIG. 3, in the inverter-integrated electrical rotating machine according to Embodiment 2 of this invention, compared with Embodiment 1 of FIG. 1, the outer circumferential cooling fin 721 protruding from the outer surface of the outer circumferential lateral plate part 72a substantially toward the outer side in the radial direction is provided substantially along the axial direction on the outer circumferential lateral plate part 72a of the heat sink case 70. Also, the inner circumferential cooling fin 722 protruding from the outer surface of the inner circumferential lateral plate part 72b substantially toward the center in the radial direction is provided substantially along the axial direction on the inner circumferential lateral plate part 72b.

The thickness and fin pitch of the outer circumferential cooling fin 721 and the inner circumferential cooling fin 722 are selected to be optimum so that the ventilation resistance of the cooling air flow passing there will not increase.

In Embodiment 2 of the above-described construction, the cold cooling air flows led in from the cooling air flow suction holes 80a, 80b in the end wall 80 of the inverter case 8 flow along the surface of the outer circumferential cooling fin 721 provided on the surface of the outer circumferential lateral plate part 72a and along the surface of the inner circumferential cooling fin 722 provided on the surface of the inner circumferential lateral plate part 72b of the heat sink case 70. Therefore, a large cooling surface area (in this case, the sum of the surface area of the outer circumferential cooling fin 721 on the outer circumferential lateral plate part 72a and the surface area of the inner circumferential cooling fin 722 on the inner circumferential lateral plate part 72b) can be secured on the heat sink case 70 for cooling the internal switching devices 73 and the like.

Also, the cooling air flow passages at the two positions, that is, the outer circumferential cooling air passage P1 and the inner circumferential cooling air passage P2, are formed in parallel, and the thickness and fin pitch of the outer circumferential cooling fin 721 and the inner circumferential cooling fin 722 are selected to be optimum so that the ventilation resistance of the cooling air flow passing there will not increase. Therefore, the ventilation resistance does not increase and the cooling air flow rate is not lowered. Thus, the internal switching devices 73 and the like can be efficiently cooled via the outer circumferential lateral plate part 72a and the inner circumferential lateral plate part 72b of the heat sink case 70.

As described above, the switching devices 73 and the like of the inverter device and the power wiring and control wiring for connecting the switching devices can be highly protected electrically and mechanically, while the switching devices and the like having a large calorific value can be efficiently cooled.

Embodiment 3

Figure 4:
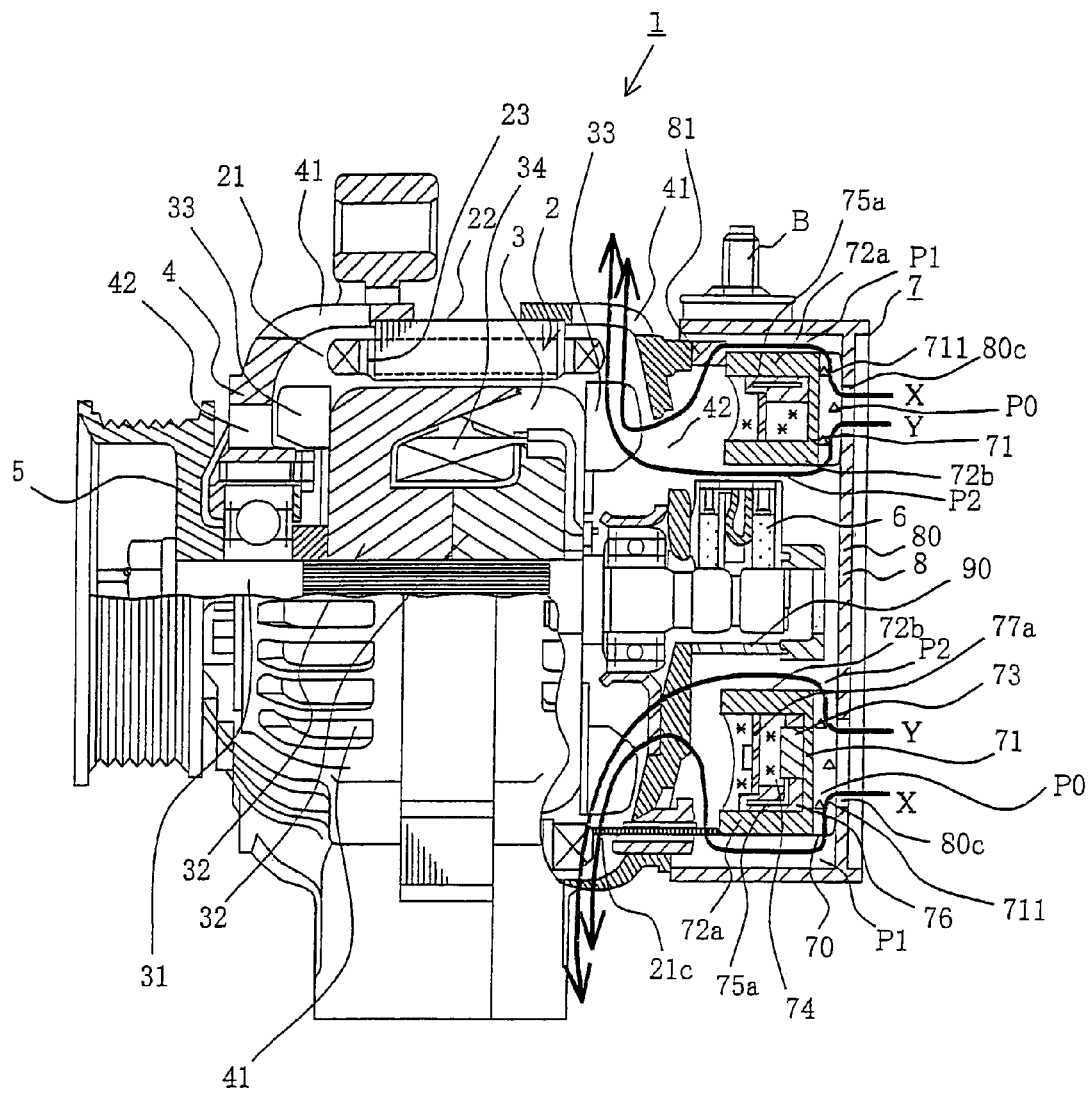
FIG. 4 is a longitudinal sectional view showing the structure of an inverter-integrated electrical rotating machine according to Embodiment 3 of this invention.

FIG. 4 is a longitudinal sectional view showing the structure of an inverter-integrated electrical rotating machine according to Embodiment 3 of this invention. This embodiment only differs from Embodiment 1 of FIG. 1 in that a cooling fin 711 is additionally provided on the bottom plate part 71 of the heat sink case 70 of the inverter device 7. The other parts of the structure are the same as in Embodiment 1 of FIG. 1.

In FIG. 4, in the inverter-integrated electrical rotating machine according to Embodiment 3 of this invention, compared with Embodiment 1 of FIG. 1, the cooling fin 711 is provided which is protruding from the outer bottom surface of the bottom plate part 71 of the heat sink case 70 toward the inverter case 8 and integrally fixed thereto. A bottom plate part cooling air passage P0 is formed between the bottom plate part 71 and the end wall 80 of the inverter case 8. Continuing to the bottom plate part cooling air passage P0, a cooling air flow suction hole 80c facing the cooling fin 711 is formed in the end wall 80 of the inverter case 8.

Also, the thickness and fin pitch of the cooling fin 711 are selected to be optimum so that the ventilation resistance of the cooling air flow passing there does not increase and so that a large surface area can be secured.

In Embodiment 3 of the above-described construction, the cold cooling air flow led in from the cooling air flow suction hole 80c in the end wall 80 first cools the cooling fin 711 on the bottom plate part 71, and then collides against the bottom surface of the bottom plate part 71, passes through the bottom plate part cooling air passage P0, and divisionally deflected toward the outer side in the radial direction and toward the center in the radial direction. The flow on the outer side in the radial direction passes through the outer circumferential cooling air passage P1 formed by the outer circumferential lateral plate part 72a and the inner circumference of the inverter case 8, and penetrates the inverter device 7 in the axial direction as indicated by arrow X in FIG. 4. The flow directed toward the center in the radial direction passes through the inner circumferential cooling air passage P2 formed between the inner circumferential lateral plate part 72b and the cover 90 surrounding the rotary shaft 31, then penetrates the inverter device 7 in the axial direction as indicated by arrow Y in FIG. 4, then is led into the motor housing 4 from the cooling air flow suction hole 42 of the housing 4, deflected to the outer side in the radial direction by the cooling fan 33, and emitted outward from the cooling air flow blowout hole 41 on the outer circumference of the housing 4.

In this manner, the cold cooling air flow led in from the cooling air flow suction hole 80c in the end wall 80 first cools the cooling fin 711 provided on the bottom plate part 71 of the head sink case 70 and then flows along the surface of the outer circumferential lateral plate part 72a and the surface of the inner circumferential lateral plate part 72b. Therefore, a large cooling surface area (in this case, the sum of the surface area of the cooling fin 711 provided on the bottom plate part 71, the surface area of the outer circumferential lateral plate part 72a and the surface area of the inner circumferential lateral plate part 72b) can be provided on the heat sink case 70 for cooling the internal switching devices 73 and the like. The internal switching devices 73 and the like can be efficiently cooled via the cooling fin 711 on the bottom plate part 71, the outer circumferential lateral plate part 72a and the inner circumferential lateral plate part 72b of the heat sink case 70.

Embodiment 4

Figure 5:
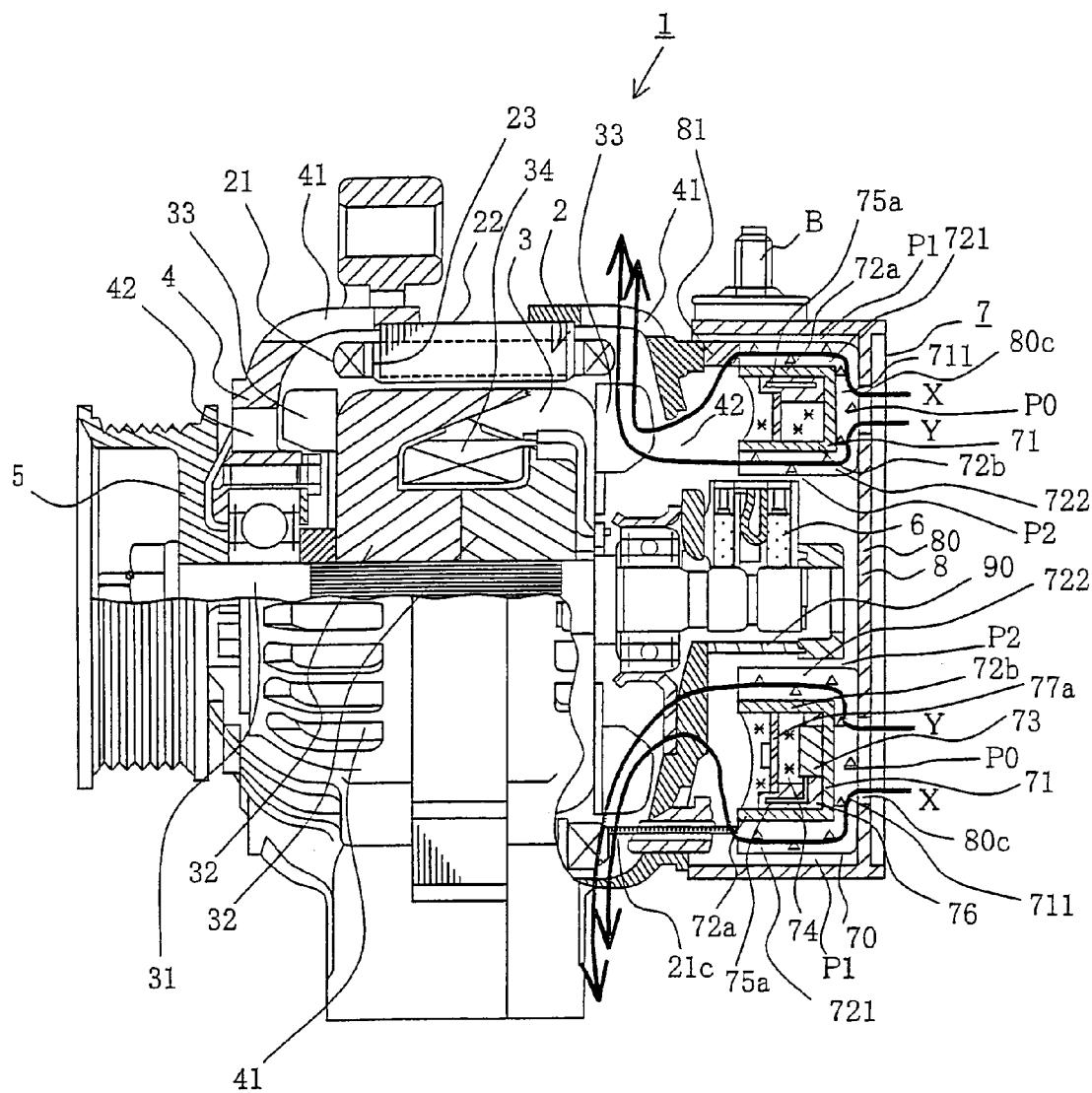
FIG. 5 is a longitudinal sectional view showing the structure of an inverter-integrated electrical rotating machine according to Embodiment 4 of this invention.

FIG. 5 is a longitudinal sectional view showing the structure of an inverter-integrated electrical rotating machine according to Embodiment 4 of this invention. This embodiment only differs from Embodiment 3 of FIG. 4 in that cooling fins 721, 722 are additionally provided respectively on the outer surfaces of the outer circumferential lateral plate part 72a and the inner circumferential lateral plate part 72b of the heat sink case 70 of the inverter device 7. The other parts of the structure are the same as in Embodiment 3 of FIG. 4.

In FIG. 5, in the inverter-integrated electrical rotating machine according to Embodiment 4 of this invention, compared with Embodiment 3 of FIG. 4, the outer circumferential cooling fin 721 protruding from the outer surface of the outer circumferential lateral plate part 72a substantially toward the outer side in the radial direction is provided substantially along the axial direction on the outer circumferential lateral plate part 72a of the heat sink case 70. Also, the inner circumferential cooling fin 722 protruding from the outer surface of the inner circumferential lateral plate part 72b substantially toward the center in the radial direction is provided substantially along the axial direction on the inner circumferential lateral plate part 72b.

The thickness and fin pitch of the outer circumferential cooling fin 721 and the inner circumferential cooling fin 722 are selected to be optimum so that the ventilation resistance of the cooling air flow passing there will not increase.

In Embodiment 4 of the above-described construction, the cold cooling air flow led in from the cooling air flow suction hole 80c in the end wall 80 of the inverter case 8 first cools the cooling fin 711 provided on the bottom plate part 71 of the heat sink case 70, and then flows along the surface of the outer circumferential cooling fin 721 provided on the surface of the outer circumferential lateral plate part 72a and the surface of the inner circumferential cooling fin 722 provided on the surface of the inner circumferential lateral plate part 72b. Therefore, a large cooling surface area (in this case, the sum of the surface area of the cooling fin 711 provided on the bottom plate part 71, the surface area of the outer circumferential cooling fin 721 on the outer circumferential lateral plate part 72a and the surface area of the inner circumferential cooling fin 722 on the inner circumferential lateral plate part 72b) can be secured on the heat sink case 70 for cooling the internal switching devices 73 and the like. Thus, the internal switching devices 73 and the like can be efficiently cooled via the cooling fin 711 on the bottom plate part 71, the outer circumferential cooling fin 721 on the outer circumferential lateral plate part 72a and the inner circumferential cooling fin 722 on the inner circumferential lateral plate part 72b of the heat sink case 70.

Embodiment 5

Figure 6:
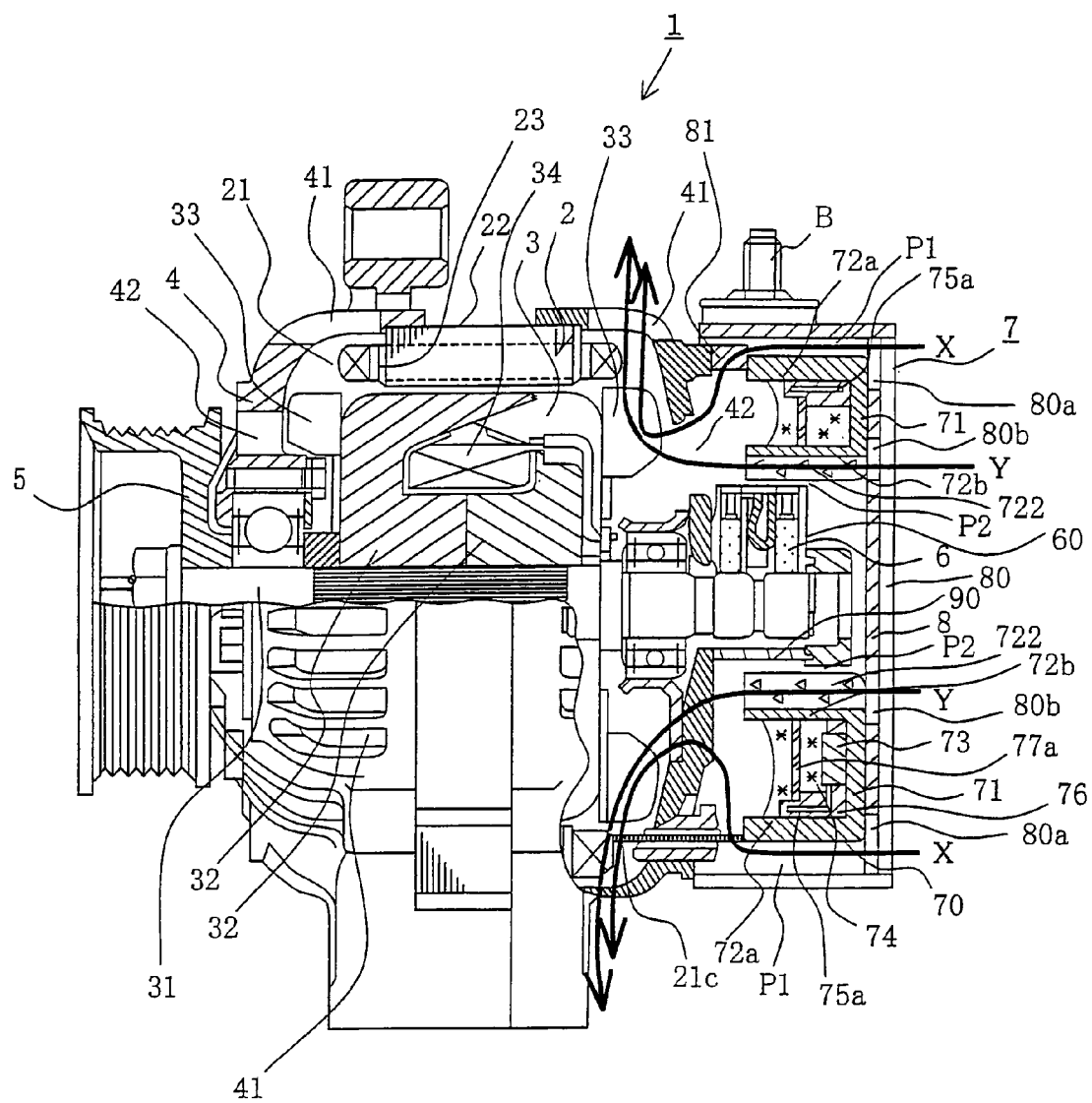
FIG. 6 is a longitudinal sectional view showing the structure of an inverter-integrated electrical rotating machine according to Embodiment 5 of this invention.

FIG. 6 is a longitudinal sectional view showing the structure of an inverter-integrated electrical rotating machine according to Embodiment 5 of this invention. This embodiment only differs from Embodiment 1 of FIG. 1 in that a cooling fin 722 is additionally provided only on the outer surface of the inner circumferential lateral plate part 72b of the heat sink case 70 of the inverter device 7. The other parts of the structure are the same as in Embodiment 1 of FIG. 1.

Embodiment 6

Figure 7:
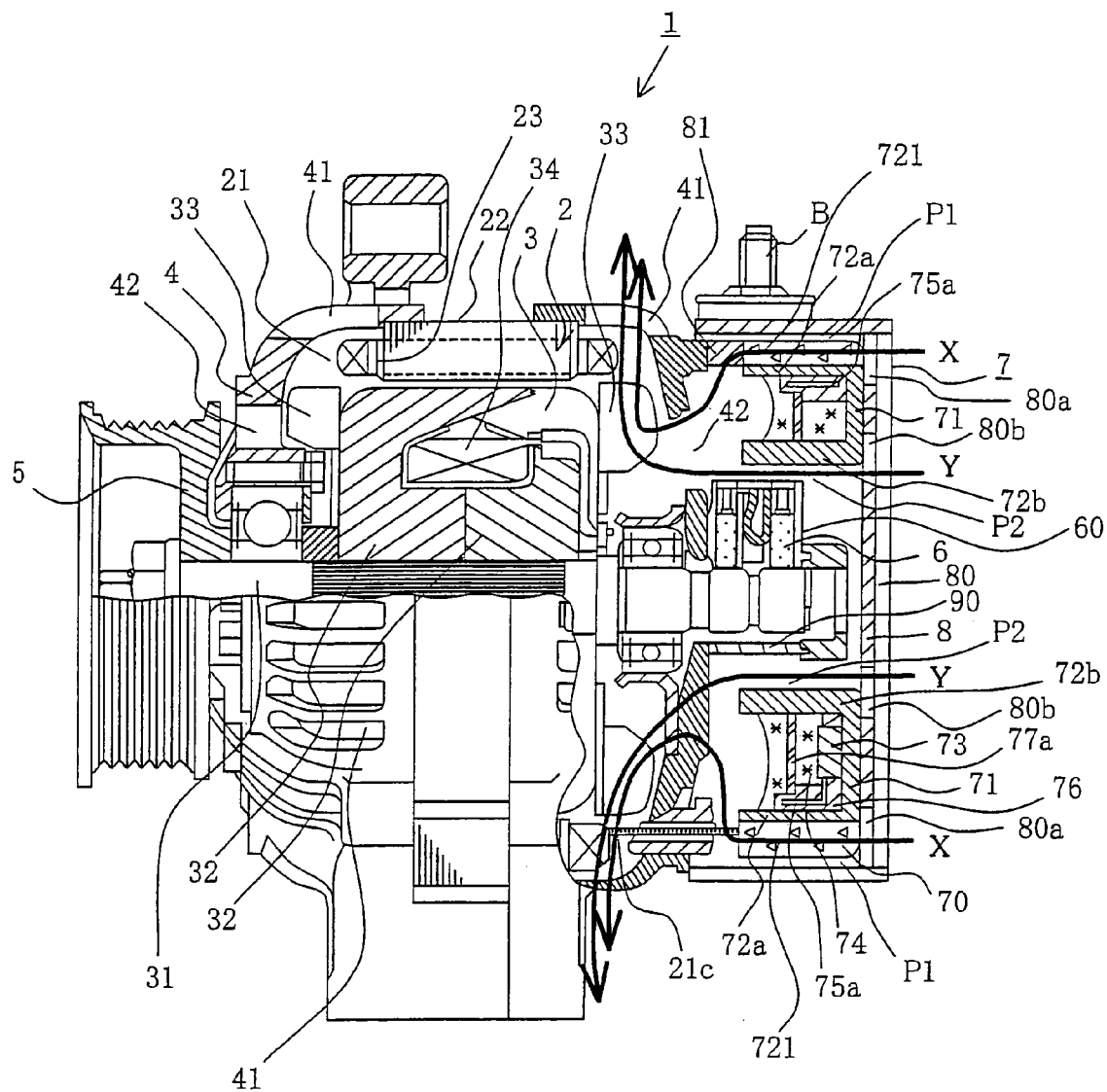
FIG. 7 is a longitudinal sectional view showing the structure of an inverter-integrated electrical rotating machine according to Embodiment 6 of this invention.

FIG. 7 is a longitudinal sectional view showing the structure of an inverter-integrated electrical rotating machine according to Embodiment 6 of this invention. This embodiment only differs from Embodiment 1 of FIG. 1 in that a cooling fin 721 is additionally provided only on the outer surface of the outer circumferential lateral plate part 72a of the heat sink case 70 of the inverter device 7. The other parts of the structure are the same as in Embodiment 1 of FIG. 1.

Embodiment 7

Figure 8:
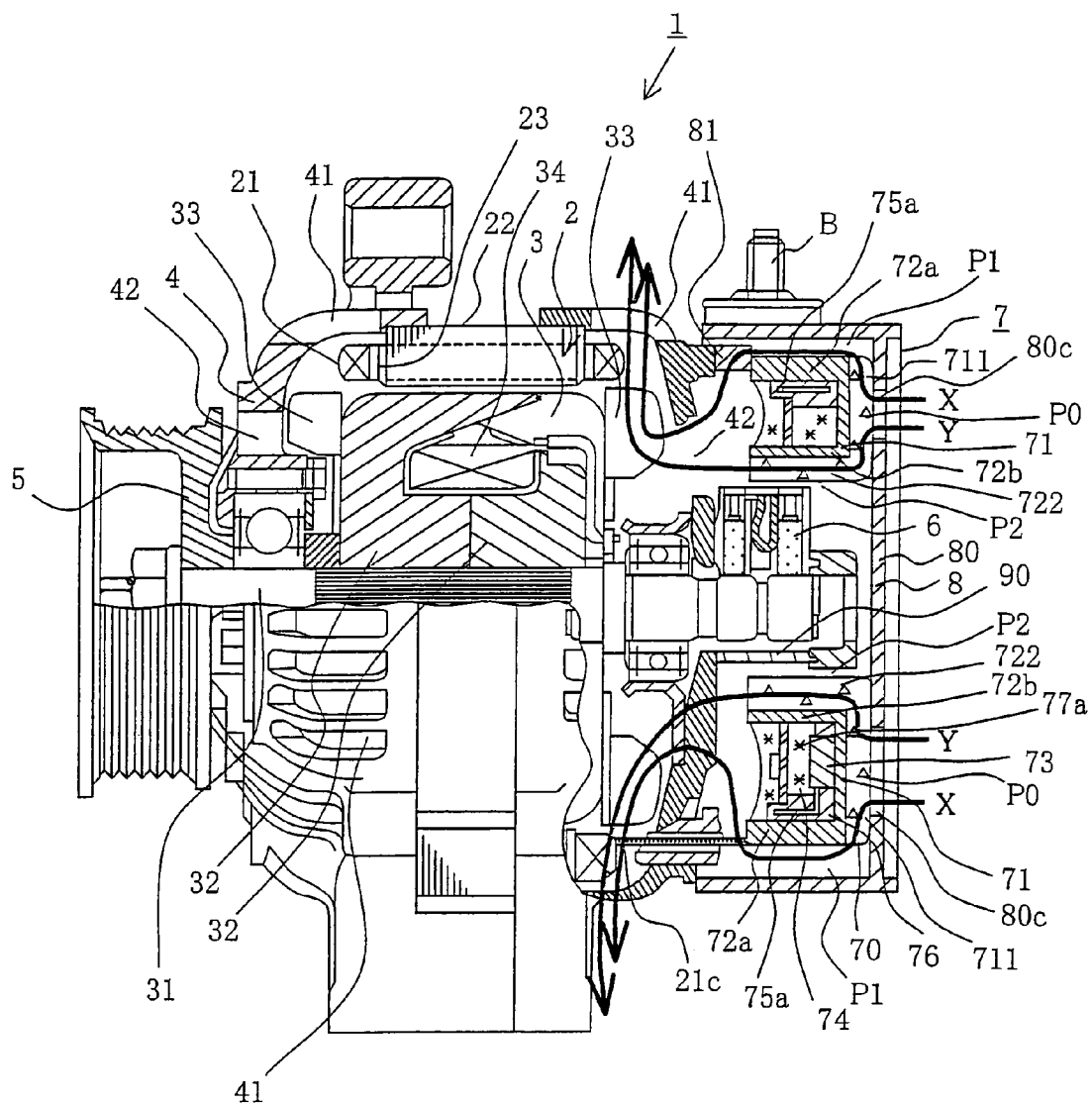
FIG. 8 is a longitudinal sectional view showing the structure of an inverter-integrated electrical rotating machine according to Embodiment 7 of this invention.

FIG. 8 is a longitudinal sectional view showing the structure of an inverter-integrated electrical rotating machine according to Embodiment 7 of this invention. This embodiment only differs from Embodiment 2 of FIG. 3 in that a cooling fin 722 is additionally provided only on the outer surface of the inner circumferential lateral plate part 72b of the heat sink case 70 of the inverter device 7. The other parts of the structure are the same as in Embodiment 2 of FIG. 3.

Embodiment 8

Figure 9:
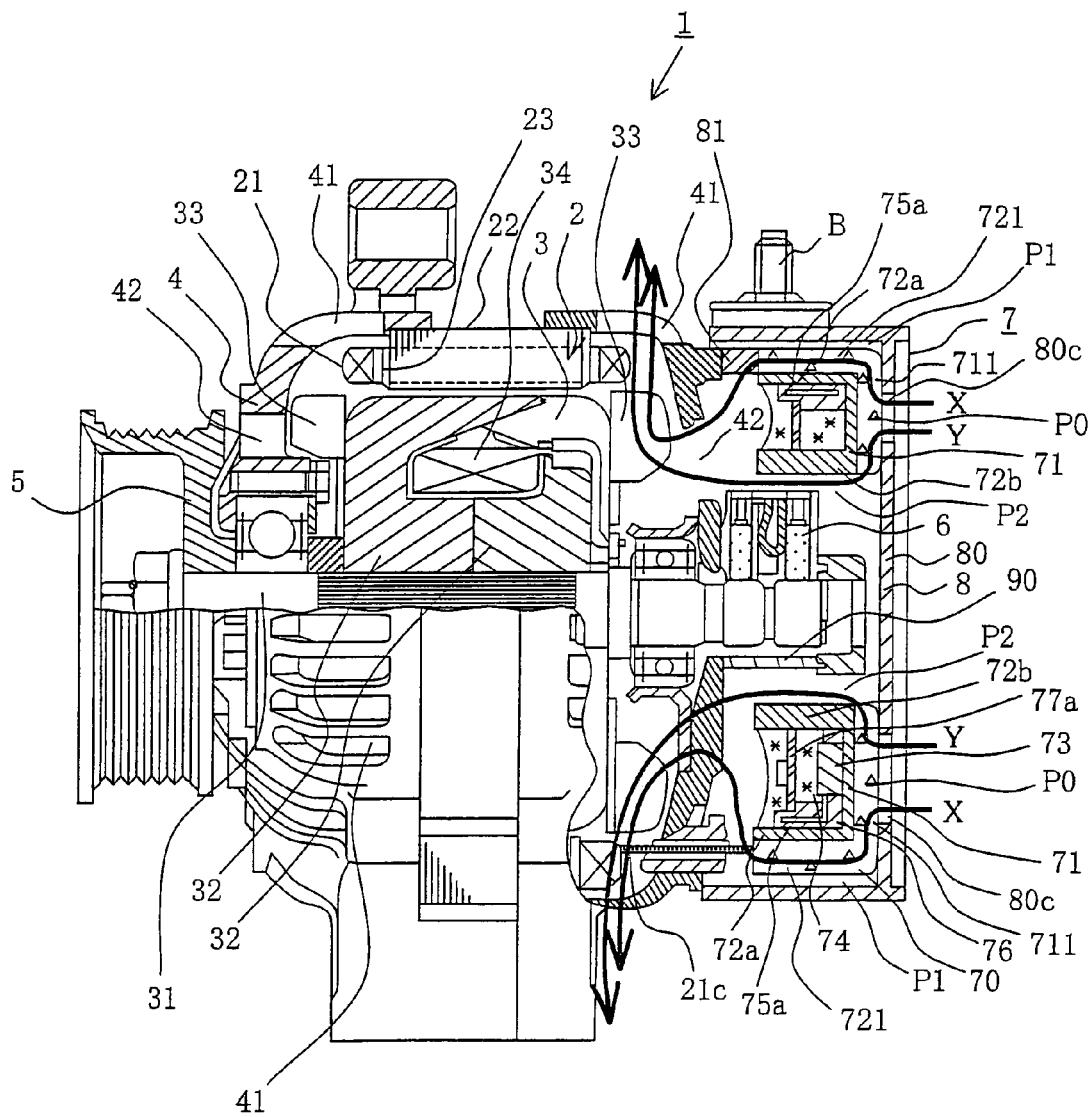
FIG. 9 is a longitudinal sectional view showing the structure of an inverter-integrated electrical rotating machine according to Embodiment 8 of this invention.

FIG. 9 is a longitudinal sectional view showing the structure of an inverter-integrated electrical rotating machine according to Embodiment 8 of this invention. This embodiment only differs from Embodiment 2 of FIG. 3 in that a cooling fin 721 is additionally provided only on the outer surface of the outer circumferential lateral plate part 72a of the heat sink case 70 of the inverter device 7. The other parts of the structure are the same as in Embodiment 2 of FIG. 3.

In the description and drawings of Embodiments 1 to 8, the switching devices 73 are connected and fixed to the bottom plate part 71 of the heat sink case 70. However, the same effect can be achieved by connecting and fixing the switching devices 73 to the outer circumferential lateral plate part 72a or the inner circumferential lateral plate part 72b.

Moreover, as shown in FIG. 3, a sealing lid 82 may be provided on an aperture 70a of the heat sink case 70. As the lid 82 is provided, water resistance and saltwater resistance can be improved. If the lid 82 is made of a resin, radiation heat from the electrical rotating machine side to the heat sink case 70 can be interrupted sufficiently.

What is claimed is:

1. An inverter-integrated electrical rotating machine comprising a electrical rotating machine that has a cooling fan fixed on a rotary shaft and sucks a cooling air flow from one end wall of a housing, and an inverter device that is situated on an outer side in an axial direction from the one end wall of the housing and fixed on the housing,
    wherein the inverter device has at least plural switching devices forming an inverter circuit that converts input DC power to AC power and feeds a stator coil of the electrical rotating machine, a control circuit that controls the inverter circuit, a heat sink case that surrounds and houses the switching devices and the control circuit and also houses wirings for connecting the switching devices and the control circuit, and an inverter case that integrally fixes and houses the heat sink case,
    the heat sink case has a wheel-like bottom plate part extended substantially in a radial direction, a small-diameter cylindrical inner circumferential lateral plate part integrally extended from the bottom plate part toward one end wall of the housing while securing a predetermined space with respect to a cover surrounding the rotary shaft, a large-diameter cylindrical outer circumferential lateral plate part integrally extended from the bottom plate part toward the one end wall of the housing, and a ring-shaped aperture opened toward the one end wall of the housing, with the bottom plate part, the inner circumferential lateral plate part and the outer circumferential lateral plate part being made of a highly thermally conductive metal material as a cooling heat sink, and forming an outer circumferential cooling air passage between the outer circumferential lateral plate part and the inverter case and an inner circumferential cooling air passage between the cover and the inner circumferential lateral plate part, and
    a cooling air flow that is led in from a cooling air flow suction hole formed in the end wall of the inverter case flows in an axial direction along the outer circumferential cooling air passage and the inner circumferential cooling air passage and then flows into the housing.

2. The inverter-integrated electrical rotating machine comprising a electrical rotating machine that has a cooling fan fixed on a rotary shaft and sucks a cooling air flow from one end wall of a housing, and an inverter device that is situated on an outer side in an axial direction from the one end wall of the housing and fixed on the housing,
    wherein the inverter device has at least plural switching devices forming an inverter circuit that converts input DC power to AC power and feeds a stator coil of the electrical rotating machine, a control circuit that controls the inverter circuit, a heat sink case that surrounds and houses the switching devices and the control circuit and also houses wirings for connecting the switching devices and the control circuit, and an inverter case that integrally fixes and houses the heat sink case,
    the heat sink case has a wheel-like bottom plate part extended substantially in a radial direction, a small-diameter cylindrical inner circumferential lateral plate part integrally extended from the bottom plate part toward one end wall of the housing while securing a predetermined space with respect to a cover surrounding the rotary shaft, a large-diameter cylindrical outer circumferential lateral plate part integrally extended from the bottom plate part toward the one end wall of the housing, and a ring-shaped aperture opened toward the one end wall of the housing, with the bottom plate part, the inner circumferential lateral plate part and the outer circumferential lateral plate part being made of a highly thermally conductive metal material as a cooling heat sink, and forming a bottom plate cooling air passage formed at least in a radial direction by a cooling fin protruding from an outer bottom surface of the bottom plate part toward the inverter case and integrally fixed thereto, an outer circumferential cooling air passage between the outer circumferential lateral plate part and the inverter case and an inner circumferential cooling air passage between the cover and the inner circumferential lateral plate part, and
    a cooling air flow that is led into the bottom plate cooling air passage from a cooling air flow suction hole formed in the end wall of the inverter case is deflected into a radial direction, and after the deflection, it flows in an axial direction along the outer circumferential cooling air passage and the inner circumferential cooling air passage and then flows into the housing.

3. The inverter-integrated electrical rotating machine as claimed in claim 1, wherein the heat sink case that has a ring-shaped aperture opened toward the one end wall of the housing and that has a doughnut-shape with a recessed schematic cross section.

4. The inverter-integrated electrical rotating machine as claimed in claim 2, wherein the cooling fin is formed substantially radially in the radial direction.

5. The inverter-integrated electrical rotating machine as claimed in claim 1, wherein the inner circumferential lateral plate part has an inner circumferential cooling fin protruding from an outer surface of the inner circumferential lateral plate part substantially toward the center in a radial direction, and the inner circumferential cooling air passage cools the inner circumferential cooling fin and is formed at least in an axial direction.

6. The inverter-integrated electrical rotating machine as claimed in claim 1, wherein the outer circumferential lateral plate part has an outer circumferential cooling fin protruding from an outer surface of the outer circumferential lateral plate part substantially toward an outer side in a radial direction, and the outer circumferential cooling air passage cools the outer circumferential cooling fin and is formed at least in an axial direction.

7. The inverter-integrated electrical rotating machine as claimed in claim 1, wherein at least the switching devices are electrically joined or fixed to one of the bottom plate part, the inner circumferential lateral plate part and the outer circumferential lateral plate part.

8. The inverter-integrated electrical rotating machine as claimed in claim 1, wherein each of the switching devices and the control circuit are covered with a resin filling the heat sink case, together with small-current wirings.

9. The inverter-integrated electrical rotating machine as claimed in claim 1, wherein the heat sink case has a lid that shields the aperture.

10. The inverter-integrated electrical rotating machine as claimed in claim 9, wherein the lid is made of a resin.

11. The inverter-integrated electrical rotating machine as claimed in claim 1, wherein a bus bar forming a −line or +line of the inverter circuit is integrally formed or electrically connected with one of the bottom plate part, the inner circumferential lateral plate part and the outer circumferential lateral plate part forming the heat sink case.

12. The inverter-integrated electrical rotating machine as claimed in claim 11, wherein in the heat sink case, a terminal board is provided in which at least a bus bar forming a −line or +line of the inverter circuit is integrally formed by using a resin.

13. The inverter-integrated electrical rotating machine as claimed in claim 2, wherein the heat sink case that has a ring-shaped aperture opened toward the one end wall of the housing and that has a doughnut-shape with a recessed schematic cross section.

14. The inverter-integrated electrical rotating machine as claimed in claim 2, wherein the inner circumferential lateral plate part has an inner circumferential cooling fin protruding from an outer surface of the inner circumferential lateral plate part substantially toward the center in a radial direction, and the inner circumferential cooling air passage cools the inner circumferential cooling fin and is formed at least in an axial direction.

15. The inverter-integrated electrical rotating machine as claimed in claim 2, wherein the outer circumferential lateral plate part has an outer circumferential cooling fin protruding from an outer surface of the outer circumferential lateral plate part substantially toward an outer side in a radial direction, and the outer circumferential cooling air passage cools the outer circumferential cooling fin and is formed at least in an axial direction.

16. The inverter-integrated electrical rotating machine as claimed in claim 2, wherein at least the switching devices are electrically joined or fixed to one of the bottom plate part, the inner circumferential lateral plate part and the outer circumferential lateral plate part.

17. The inverter-integrated electrical rotating machine as claimed in claim 2, wherein each of the switching devices and the control circuit are covered with a resin filling the heat sink case, together with small-current wirings.

18. The inverter-integrated electrical rotating machine as claimed in claim 2, wherein the heat sink case has a lid that shields the aperture.

19. The inverter-integrated electrical rotating machine as claimed in claim 18, wherein the lid is made of a resin.

20. The inverter-integrated electrical rotating machine as claimed in claim 2, wherein a bus bar forming a −line or +line of the inverter circuit is integrally formed or electrically connected with one of the bottom plate part, the inner circumferential lateral plate part and the outer circumferential lateral plate part forming the heat sink case.

21. The inverter-integrated electrical rotating machine as claimed in claim 20, wherein in the heat sink case, a terminal board is provided in which at least a bus bar forming a −line or +line of the inverter circuit is integrally formed by using a resin.

* * * * *